UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

BLUE-GREEN DYE.

SPECIFICATION forming part of Letters Patent No. 453,477, dated June 2, 1891.

Application filed August 4, 1890. Serial No. 360,975. (Specimens.)

To all whom it may concern:

Be it known that I, ALBERT HERRMANN, doctor of philosophy, a citizen of the Empire of Germany, residing at Höchst-on-the-Main, Empire of Germany, have invented certain new and useful Improvements in Blue-Green Coloring-Matter; and I do hereby declare the following to be a full, clear, and exact description of the invention, such as will enable others skilled in the art to which it appertains to make and use the same.

I have discovered that sulphonic acid derived from metachlortetralkyldiamidotriphenylcarbinol is also fast blue-green acid coloring-matter just like sulphonic acids derived from the metaoxy and meta-amido derivatives of the coloring-matters of the malachite-green series. (See Letters Patents No. 412,613, dated October 8, 1889, Reissue No. 11,077, dated May 20, 1890, and No. 412,614, dated October 8, 1889, Reissue No. 11,078, dated May 20, 1890.) This sulphonic acid is produced in quite a similar way to the corresponding metaoxy and meta-amido derivatives—namely, by oxidizing sulphonic acid derived from metachlortetralkyldiamidotriphenylmethan or by sulphonating metachlortetralkyldiamidotriphenylcarbinol.

In working according to the methods at present known one will only with difficulty succeed in producing pure leuco bases of the malachite-green series combined with chlorine in the meta position alone. Pure metachlorbenzaldehyde is very high in price, so that no paying manufacture could be carried on if this body were chosen as raw material for producing those bases.

I have discovered a simple process for the production of metachlortetraalkyldiamidotriphenylmethan—

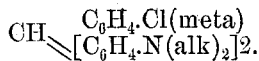

This process is based upon the conversion of the metadiazotetralkyldiamidotriphenylmethanchloride into metachlortetralkyl diamidotriphenylmethan by means of copper or cuprous chloride. A metachloro leuco base of the malachite-green series is sulphonated and the leuco-sulphonic acid thus produced oxidized, or the same result is obtained by sulphonating metachlortetralkyldiamidotriphenylcarbinol produced by oxidization of the leuco base.

I. *Production of metachlortetralkyldiamidotriphenylmethan.*—40.1 parts, by weight, of metaamidotetraethyldiamidotriphenylmethan are dissolved in one hundred parts, by weight, of hydrochloric acid of thirty per cent. HCl and one hundred parts, by weight, of water. This solution is cooled down to 0° centigrade and then a cold solution of F, two parts, by weight, of nitrite of 96.2 per cent. Na NO$_2$ is slowly mixed therewith. The conversion of the diazo compound into the chlorine substitution product may be carried out in two different ways.

A. Twenty parts, by weight, of cuprous chloride Cu$_2$Cl are dissolved in three hundred parts, by weight, of concentrated hydrochloric acid. The solution is heated to from 70° to 80° centigrade, and then the solution of hydrochloride of metadiazotetraethyldiamidotriphenylmethan produced, as described above, is caused to flow into it, when there will be an impetuous development of nitrogen. After the reaction is completed it is filtered off from the cuprous chloride that remains. From the filtrate the copper may be separated by hydrogen-sulphide, and then the metachlor leuco base be precipitated by means of alkali; or the solution may be mixed with a small quantity of alkali, in order to deaden the acid, and then the leuco base be precipitated in the form of its hydrochloride by the addition of common salt.

B. The conversion of the diazo compound into the halogen compound is carried out to much greater advantage in the following way: The cold solution of hydrochloride of metadiazotetraethyldiamidotriphenylmethan is mixed very slowly, and while kept well agitated with a paste of copper, the weight of which corresponds to four parts, by weight, of copper, an impetuous development of nitrogen will set in, on account of which the addition of the copper must be made very slowly. After the reaction is completed it is filtered off from the residue, consisting of copper and cuprous chloride. In order to neutralize the acid, the filtrate is mixed with a small quantity of soda, and from the solution, still acid, the hydrochloride of the metachlor leuco base is precipitated by means of common salt. The hydrochloride is dissolved in water and the base precipitated by means of soda. The mass can also be treated in the following way—namely, separating the small quantity of copper by means of hydrogen-sulphide and precipitating the base from the filtrate by means of soda. In both cases there is obtained a nearly-colorless crystalline powder, which, however, on exposure to the air, and still more on being dried on the water bath, assumes a dark color. The base metachlortetraethyldiamidotriphenylmethan is nearly insoluble in cold alcohol, of difficult solubility in hot alcohol, but easily soluble in ether and hydrocarbons. With mineral acids it forms easily soluble salts.

I have prepared in this way up to this day the following metachlor leuco bases: metachlortetramethyldiamidotriphenylmethan, metachlordimethyldibenzyldiamidotriphenylmethan,

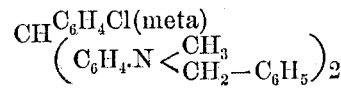

metachlordiethyldibenzyldiamidotriphenylmethan. The two benzylized compounds show but slightly basic qualities, and after decomposition of the diazo compound they are therefore in mixture with the copper and cuprous chloride. The easiest way for separating them from these bodies is by boiling the precipitate with benzine.

II. *Production of sulphonic acid of metachlortetralkyldiamidotriphenylmethan.*— From metachlortetralkyldiamidotriphenylmethan is obtained the sulphonic acid by treatment of the same with sulphuric acid.

In carrying out the invention I proceed as follows: Twenty parts, by weight, of metachlortetraethyldiamidotriphenylmethan are dissolved in one hundred parts, by weight, of fuming sulphuric acid of twenty per cent. $SO_3$. The solution is heated to from 60° to 70° centigrade until a sample is completely taken up by hot diluted ammonia. The completion of the reaction is recognized with still greater certainty by dropping a sample in soda-lye, filtering off, and observing if the salt which separates gives a clear solution with water. The mass is poured into water and is with advantage treated further, as described hereinafter. To the solution is added soda until alkaline reaction ensues, and when necessary for the complete precipitation of the sodium salt of the novel sulphonic acid there is added common salt solution. Then it is filtered off from the precipitated leuco salt, the salt dissolved again in hot water, filtered, and precipitated by means of common salt, again filtered off and dried. The sodium salt of the leuco sulphonic acid thus obtained is in form of a powder slightly colored green, of difficult solubility in water and insoluble in salt solutions. On the addition of a mineral acid to the aqueous solution the acid precipitates in crystalline form. In this way I have produced also the sulphonic acid from metachlortetramethyldiamidotriphenylmethan.

The sulphonation of the benzylized leuco bases mentioned in I is carried out in a different way, as described in the following example: Twenty parts, by weight, of metachlordiethyldibenzyldiamidotriphenylmethan are dissolved in one hundred parts, by weight, of fuming sulphuric acid of twenty per cent. $SO_3$. Already at ordinary temperature the greater part of the base is sulphonated. In order to complete the sulphonation, it is heated to from 50° to 60° centigrade until a sample gives a clear solution in water and in diluted ammonia. The mass is poured into water and converted into the calcium or sodium salt in well-known manner. By the same method the sulphonic acid is produced from the metachlordimethyldibenzyldiamidotriphenylmethan.

III. *Oxidation of sulphonic acid from metachlortetralkyldiamidotriphenylmethan.*—Five parts, by weight, of sodium salt of the sulphonic acid from metachlortetraethyldiamidotriphenylmethan are dissolved in one thousand parts, by weight, of water, the solution heated to boiling-point and mixed with the calculated quantity of diluted sulphuric acid and peroxide of lead. It is filtered off from the sulphate of lead, which will have separated, and the coloring-matter solution evaporated to dryness. The novel coloring-matter is in the form of a copper-red powder with metallic luster. It dissolves easily in water with green coloration, and dyes wool and silk in an acid bath very fast and level green-blue shades. In the same way the other sulphonic acids described in II are oxidized to coloring water.

What I claim as new, and wish to secure by Letters Patent, is—

1. The process for the production of blue-green coloring-matter by converting metadiazotetralkyldiamidotriphenylmethanchloride into the corresponding metachlor leuco base by treatment with copper or cuprous chloride, sulphonation of the chlor leuco base and oxidation of the leuco-sulphonic acid thus obtained by means of peroxide of lead, in the way substantially as described.

2. As a new article of manufacture, coloring-matter which is the sulphonic acid of metachlortetralkyldiamidotriphenylcarbinol, a copper-red powder with metallic luster, easily soluble in water, giving green coloring of difficult solubility in alcohol, not soluble in benzine, the green coloring of the aqueous solution turning yellow-green on the addition of an acid, and blue-green on the addition of ammonia or an alkali, and dyeing wool and silk blue-green shades in an acid bath.

In testimony whereof I affix my signature in presence of two witnesses.

ALBERT HERRMANN.

Witnesses:
JOSEF REVERDY,
HEINRICH HAHN.